Aug. 9, 1927.
E. C. MALLETTE
1,638,352
DEMOUNTABLE RIM WHEEL
Filed March 28, 1925 2 Sheets-Sheet 1
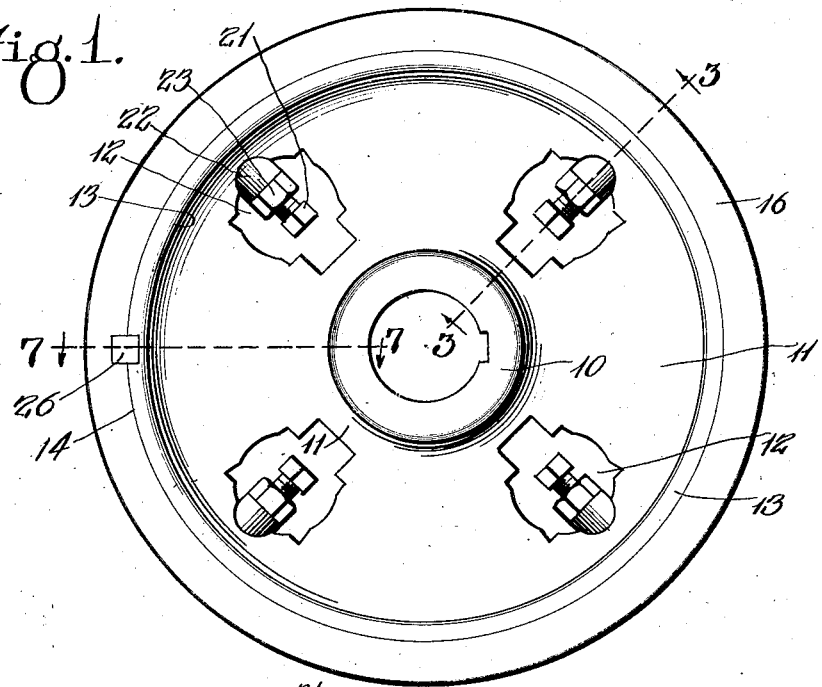
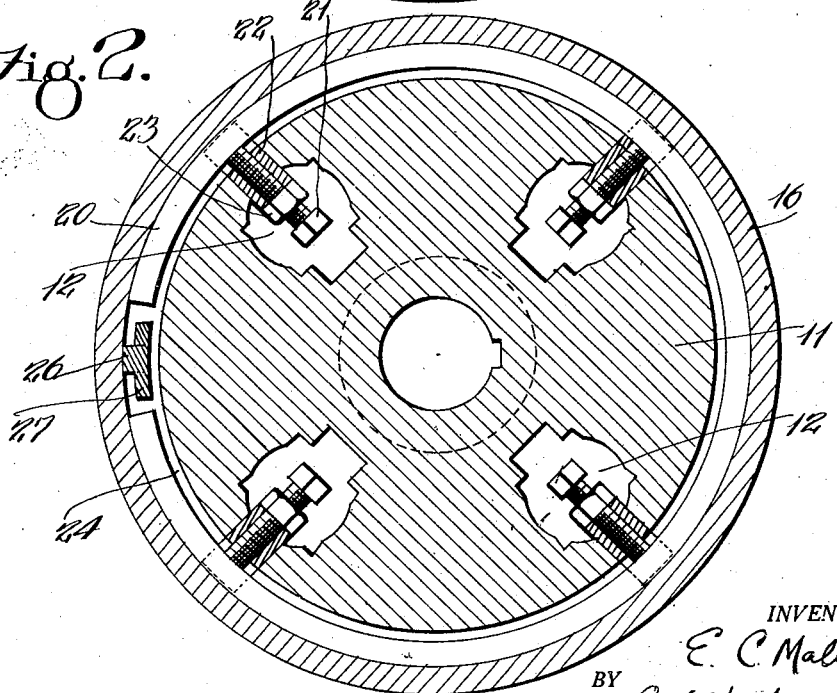
INVENTOR.
E. C. Mallette
BY
ATTORNEYS.

Aug. 9, 1927.

E. C. MALLETTE 1,638,352

DEMOUNTABLE RIM WHEEL

Filed March 28, 1925

INVENTOR.
E. C. Mallette
BY
ATTORNEYS.

Patented Aug. 9, 1927.

1,638,352

UNITED STATES PATENT OFFICE.

EARL C. MALLETTE, OF BASKIN, LOUISIANA.

DEMOUNTABLE-RIM WHEEL.

Application filed March 28, 1925. Serial No. 19,108.

This invention relates to wheels and has special reference to a demountable rim wheel and means for holding the rim on the wheel center.

The invention is adaptable for use in connection with various types of wheels such as car wheels, belt pulleys and gears both straight and bevel as well as other uses which will readily suggest themselves to engineers and those skilled in mechanical devices.

One important object of the invention is to improve the general construction of wheels having demountable rims.

A second important object of the invention is to provide improved means extending substantially entirely around the wheel center for securing the rim to the center.

A third important object of the invention is to provide improved means for actuating the securing element.

A fourth important object of the invention is to provide novel means for preventing peripheral slipping of the securing means and rim about the center.

A fifth important object of the invention is to provide an improved arrangement of this class embodying a securing means which not only holds the rim in place on the center but also forces it laterally into its proper position.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1 is a side view of a wheel constructed in accordance with this invention.

Figure 2 is a section therethrough taken at right angles to the axis of the wheel and showing the securing means.

The wheel center here shown is of the plate type and has the usual butt 10 and plate 11. This plate is provided with circumferentially spaced openings 12 near the wheel center rim 13 and it is to be noted that these openings, in effect, divide the plate into a series of spokes of broad flat character. From this and what follows it will be obvious that spokes of the usual kind may be employed in place of the plate but it is not deemed necessary to show such a wheel center as the provision of either a plate or spokes in no manner alters the inventive idea involved.

Figure 3:
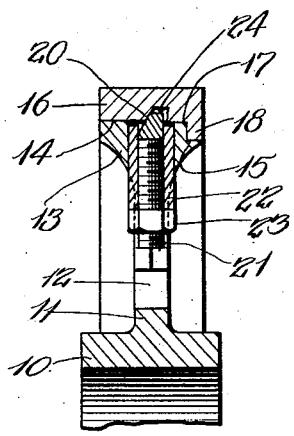
Figure 3 is a section on the line 3—3 of Figure 1.
Figure 4:
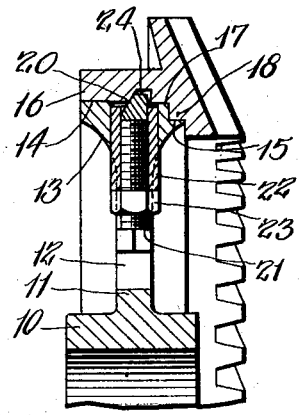
Figure 4 is a similar section through a bevel gear.
Figure 5:
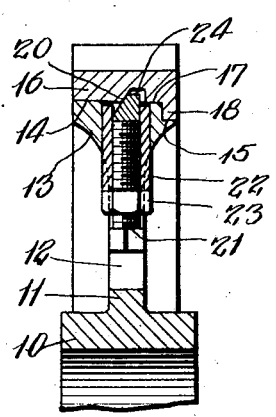
Figure 5 is a similar section through a spur gear.
Figure 6:
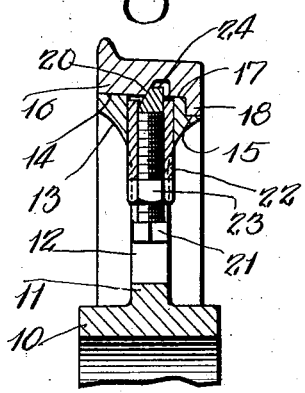
Figure 6 is a similar view through a car wheel.
Figure 7:
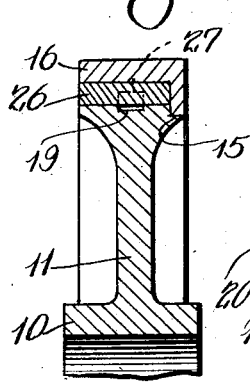
Figure 7 is a section on the line 7—7 of Figure 1.
Figure 8:
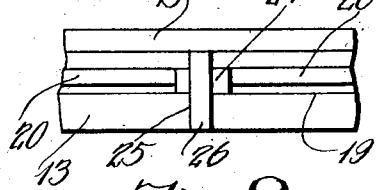
Figure 8 is an edge view of a portion of a wheel center showing a special key arrangement used herewith.

The outer surface of the wheel rim 13 is frusto-conical in form as can be seen at 14 and is provided at its smaller end with a rabbet 15. On this wheel center rim is fitted the demountable rim 16 which has its outer surface properly shaped for the purpose desired as can be seen from Figures 3 to 6 inclusive. The inner surface 17 of this rim is frusto-conical and at its smaller diameter it is provided with a flange 18 fitting the rabbet 15. The wheel center rim is provided with a peripheral groove or channel 19 of rectangular cross section and in this channel seats a peripheral securing strip 20 constituting an expansion ring, open at one point (left hand side as shown in Fig. 2) having the side remote from the rabbet 15 bevelled as can be seen in Figure 3. This strip is preferably made of spring metal and is projectable outwardly of the rim 13 by means of radially disposed adjusting screws 21 which pass at intervals through the rim 13, suitable bushings 22 being used when the wheel center is made of aluminum or other soft material. Lock or jam nuts 23 are provided on these screws to prevent accidental movement when adjusted.

Figure 9:
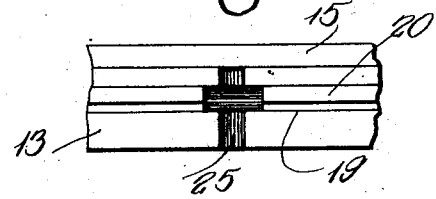
Figure 9 is a similar view with the key removed.
Figure 10:
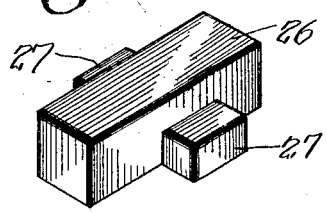
Figure 10 is an enlarged perspective of the key.

The rim 16 is provided with an internal groove or channel 24 having the side remote from the flange 18 bevelled to cooperate with the bevelled face of the ring 20, this groove being slightly displaced toward the flange in its relation to the groove 19 so that the ring 20, in moving outwardly tends to cause the rim 16 to shift laterally on the wheel center and forces it firmly into position with the flange 18 in the rabbet 15. The ring 20 is of such length that its ends are somewhat spaced and these spaced ends are positioned on opposite sides of a transverse groove 25 formed in the wheel center rim as best shown in Figure 9. The rim 16 is correspondingly grooved and these grooves form a key way wherein is fitted a key 26 having lateral projections 27 which fit in the groove 19 and close the space between the ends of the ring 20. Thus this key not only keeps the rim 16 from peripheral shifting on the wheel center but also keeps the ring 20 from similar shifting movement so that the adjusting screws 21 are never alined with the gap in the ring.

In operation it is merely necessary to slip the rim 16 on the wheel center and expand the ring 20 by screwing up the screws 21. This projects the ring and secures the parts together.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. In combination, a wheel center having a peripheral groove, a contractile spring ring held in said groove, a demountable rim slidable laterally over said center and having a peripheral groove on its inner side positioned to receive said ring, means carried by the wheel center to expand the ring into the last mentioned groove, and a key fitting into alined notches in the wheel center and rim and into a break in said ring whereby the ring, the rim and center are held against peripheral movement with respect to each other said expansion ring and the peripheral groove in the rim co-acting throughout their extent to force the rim on the wheel center.

2. In combination, a wheel center having a frusto-conical periphery and provided with a peripheral groove, a contractile spring ring held in said groove, a demountable rim having a frusto-conical interior surface and provided with a peripheral groove in said surface, means carried by the wheel center for forcing the ring into engagement with the groove in the rim, and a key capable of holding the rim and ring from peripheral movement on the center said expansion ring and the peripheral groove in the rim co-acting throughout their extent to force the rim on the wheel center.

3. In combination, a wheel center having a peripheral groove, a contractile spring split ring mounted in said groove, a demountable rim slidable laterally on and off the center and having a groove registering with the groove in the center and into which said ring may expand, means to expand the ring, alined cross slots in the rim and center, the split in the ring being alined with the cross slots, a key fitting in said cross slots and lugs on said key fitting the peripheral slot to prevent lateral movement of the key, said lugs fitting the slit in the ring whereby the parts are held against mutual peripheral rotation.

In testimony whereof I affix my signature.

EARL C. MALLETTE.